(No Model.)
H. FRONEFIELD & J. M. PRICE.
MOWER OR HARVESTER CUTTER.
No. 430,472. Patented June 17, 1890.
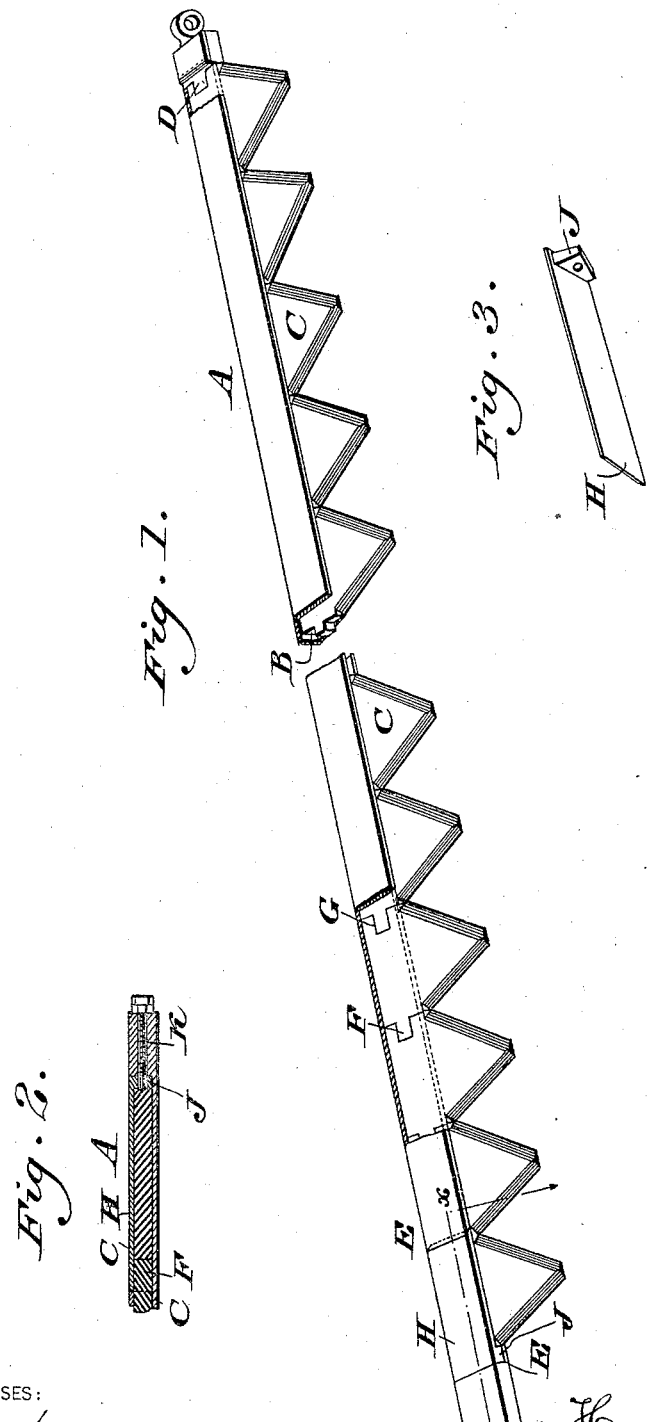

UNITED STATES PATENT OFFICE.

HORACE FRONEFIELD AND JOSEPH M. PRICE, OF PHILADELPHIA, PENNSYLVANIA.

MOWER OR HARVESTER CUTTER.

SPECIFICATION forming part of Letters Patent No. 430,472, dated June 17, 1890.

Application filed September 27, 1889. Serial No. 325,235. (No model.)

*To all whom it may concern:*

Be it known that we, HORACE FRONEFIELD and JOSEPH M. PRICE, citizens of the United States, residing in the city and county of Philadelphia, State of Pennsylvania, have invented a new and useful Improvement in Mower or Harvester Cutters, which improvement is fully set forth in the following specification and accompanying drawings.

Our invention relates to mower and harvester cutter bars; and it consists of the combination of parts herein set forth and claimed, wherein a cutter-bar having a groove therein with a throat in which are inserted separable knives is employed, the latter being formed with tongues and grooves or slots to securely hold the same together, as will be more fully hereinafter described.

Figure 1 represents a perspective view, partially broken away, of a cutter-bar embodying our invention. Fig. 2 represents a section on line $x$ $x$, Fig. 1. Fig. 3 represents a detail perspective view of the locking-plate.

Similar letters of reference indicate corresponding parts in the three figures.

Referring to the drawings, A designates the cutter-bar having a beveled groove B formed therein to receive the removable knives C. The two ends of the bar are closed, and the one end thereof has a tongue D, for a purpose hereinafter stated. The side of the bar adjacent to the opposite end is constructed with a throat E for the insertion of the knives C therethrough into the groove B. The said knives C are each constructed with a tongue F, and a groove or slot G on opposite edges thereof. The knives are inserted in the bar A through the throat E, and the tongue of one interlocks with the groove or slot of the other. The groove or slot of the first knife inserted is engaged by the tongue D in the end of the bar, and is thereby held in position. The last knife of the series employed is without the tongue F in one edge thereof.

After all the knives have been mounted in position in the bar A a locking-plate H is inserted in the throat E, the same being formed with an ear J, which enters the groove B of the bar. A clamping-screw K passes through the end of the bar A, and through the depending ear J of the plate H, its inner end impinging against the adjacent knife and securely clamps the knives in the bar, and holds the plate H intact with the said bar. The groove B of the bar is beveled to prevent the removal or disengagement of the knives by drawing them directly therefrom.

Having thus described our invention, what we claim as new, and desire to secure by Letters Patent, is—

1. A cutter-bar having closed ends, in one of which is formed a tongue, and having a groove with a throat, knives with grooves or slots, and tongues in opposite edges, a locking-plate with an ear, and a clamping-screw, substantially as described.

2. A cutter-bar having a beveled longitudinal groove provided with a throat and having closed ends, a tongue secured to one of said ends and projecting into the groove, a series of knives, each of which, except an end one, is provided with interlocking tongues and grooves, a locking-plate with an ear having an opening therein, and a screw passing through one of the closed ends of the bar and the ear of the plate and bearing against one of the knives, said parts being combined substantially as described.

HORACE FRONEFIELD.
JOSEPH M. PRICE.

Witnesses:
JOHN A. WIEDERSHEIM,
WM. C. WIEDERSHEIM.